United States Patent [19]

Komarnicki

[11] 4,240,221

[45] Dec. 23, 1980

[54] STRIKE LIGHT FISHING ROD HOLDER

[76] Inventor: Gene Komarnicki, 2 Gertrude St., St. Albans, Victoria, Australia

[21] Appl. No.: 15,639

[22] Filed: Feb. 27, 1979

[30] Foreign Application Priority Data

Mar. 16, 1978 [AU] Australia .................. PD3737

[51] Int. Cl.³ .................................... A01K 97/12
[52] U.S. Cl. .................................. 43/17; 43/17.5
[58] Field of Search ............... 43/17, 17.5, 21.2; 362/109

[56] References Cited

U.S. PATENT DOCUMENTS

| | | | |
|---|---|---|---|
| 3,020,664 | 2/1962 | Snyder | 43/17 |
| 3,959,911 | 6/1976 | Puckett | 43/17 |
| 4,155,189 | 5/1979 | Engman | 43/17 |

FOREIGN PATENT DOCUMENTS

248643  5/1963  Australia ........................ 43/17

*Primary Examiner*—Nicholas P. Godici
*Attorney, Agent, or Firm*—Thomas W. Cole

[57] ABSTRACT

A fishing rod support and warning device comprises an elongated housing, a contact rod resiliently mounted for axial movement within said housing at one end thereof, the outer end of said rod extending from said housing and having support means associated therewith to support a fishing rod. The inner end of the contact rod being adapted, directly or indirectly, to electrically contact a power source upon axial pressure being exerted on the contact rod by the fishing rod to effect closure of an electric circuit comprising said power source and a warning means. Means are associated with said contact rod for altering the degree of resilience of the rod mounting.

6 Claims, 3 Drawing Figures

STRIKE LIGHT FISHING ROD HOLDER

FIELD OF THE INVENTION

This invention relates to a fishing rod support which acts as a warning device signifying when a fish is biting. The device is particularly useful for evening or night fishing when observation of the fishing rod and its line is difficult or impossible.

SUMMARY OF THE INVENTION

It is thus an object of this invention to provide a fishing rod support which also acts as a warning device in the above sense which is relatively small and compact (i.e. can be easily carried by a fisherman) and is economic to manufacture.

It is a further object of the invention to provide a device of the type referred to hereinabove which can be adjusted to cater for different weather conditions, for instance, rough or smooth water.

With the above principal objectives in view and according to the broadest aspect of the present invention, there is provided a fishing rod support and warning device comprising an elongated housing, a contact rod resiliently mounted for axial movement within said housing at one end thereof, the outer end of said rod extending from said housing and having support means associated therewith to support a fishing rod, the inner end of the contact rod being adapted, directly or indirectly, to electrically contact a power source upon axial pressure being exerted on the contact rod by the fishing rod to effect closure of an electric circuit comprising said power source and a warning means, and means associated with said contact rod for altering the degree of resilience of the rod mounting.

Conveniently, the contact rod is spring mounted and has a threaded portion operatively associated with complemental threaded means within said housing for varying the load on the spring upon appropriate rotation of the rod.

Advantageously, the threaded means can take the form of an internally threaded annular disc peripherally recessed to engage at least one axially extending rib radially inwardly extending from the inner wall of the housing.

The power source may conveniently be constituted by one or more batteries connected in series and these may advantageously be located within the housing. The warning means may be constituted by a suitable light globe or a sound emitting device such as an alarm located within or outside the housing. Preferably, the present invention uses a suitable light globe located within the housing.

According to a preferred embodiment of this invention, the housing comprises three separate portions which are capable of assembly or disassembly by means of threaded connections between these portions, the two connections being located adjacent the inner end of said contact rod and the light globe respectively to enable access to said batteries and said globe. Advantageously, the threaded connections between the two outer portions and the central portion are in the form of threaded bushes located in the appropriate housing portions, said spring, contact rod, bushes and central housing portion being of an electrically conductive material so as to constitute a complete electrical circuit in conjunction with the power source.

In the aforementioned preferred embodiment, advantageously the two outer portions of the housing are moulded from a suitable synthetic plastic material, and in the case of the lower of the two outer portions, the means for fixing the device in a substantially upright position to the ground, which may be in the form of a stake, is integrally moulded with the lower housing portion. The upper of said outer portions of the housing may advantageously be moulded so as to include the axially extending radially inwardly directed rib.

It will be appreciated that the threaded connections provided in conjunction with the three separate portions of the housing enable easy replacement of the batteries and globe when required.

DESCRIPTION OF THE DRAWINGS

The invention will now be described with reference to a preferred practical arrangement shown in the accompanying drawings wherein.

DESCRIPTION OF A PREFERRED EMBODIMENT

Figures 1, 2, 3:
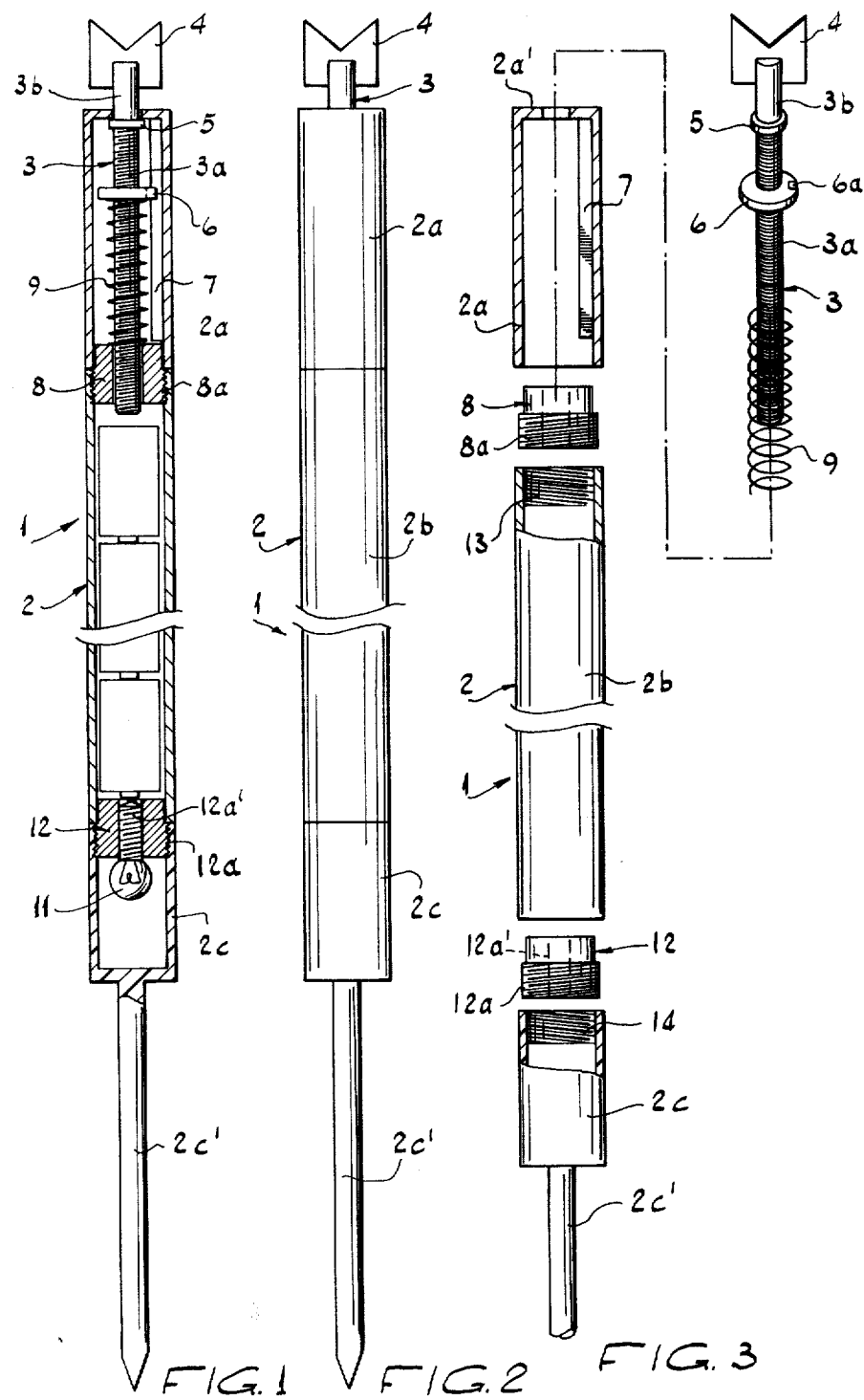
FIG. 1 is a cross-sectional view of a fishing rod support and warning device according to this invention.
FIG. 2 is an elevational view of the device of FIG. 1.
FIG. 3 is an exploded view of the device of FIG. 1.

Referring to FIGS. 1 to 3, the device of the invention, generally indicated as 1, comprises a cylindrical housing 2 which consists of a metallic central portion 2b and two end portions 2a, 2c conveniently moulded from a suitable synthetic plastic material. Housing portions 2a, 2b and 2c are assembled by means of threaded metallic inserts or bushes 8 and 12 (referred to hereinbelow).

Housing portion 2a has an annular inwardly extending flange 2a' at its upper end and an axially extending rib 7 extending from the inner wall thereof.

Housing portion 2c has an integrally moulded elongated stake 2c' for fixing the device, in the operative position, to the ground.

Housing portion 2a houses a contact rod 3 having a threaded portion 3a. The rod 3, at its upper end 3b, carries a recessed support 4 for supporting a fishing rod (not shown). The rod 3 extends through annular flange 2a' acting as a collar, a retention collar 5 and threadably engages a further collar 6 recessed at its periphery at 6a (FIG. 3), for slidable engagement with rib 7. Rib 7 extends axially between annular flange 2a' and a spring support disc 8 mounted at the lower end of housing portion 2a. Disc 8 has a threaded portion 8a.

A helical spring 9 is located between the spring support disc 8 and the threaded collar 6 and resiliently restrains the rod 3 from downward movement.

Housing portion 2b houses a number of batteries 10 connected in series and retained within said portion 2b by means of collar 12 having a threaded portion 12a mounted at the lower end of housing portion 2b. Threaded portion 12a has an internally threaded portion 12a' which houses a suitable globe 11.

The portion of housing portion 2c adjacent globe 11 is made of translucent material.

Housing portions 2b and 2c are provided at their upper ends with internally threaded portions 13 and 14 which engage the threaded portions 8a and 12a of collars 8 and 12 respectively.

In the above embodiment of the invention, housing central portion 2b, collars 8 and 12, rod 3 and spring 9 are made of an electrically conductive material, for example, a suitable metal or metal alloy.

In use, when a fish bites, the fishing rod, and in turn support 4 and rod 3, is depressed against the bias of resilient spring 9 and contact rod 3 contacts the battery 10 closing the circuit resulting in the globe 11 lighting up.

To adjust the degree of resilience of the spring 9 to cater for different prevailing weather conditions, the rod 3 is simply rotated in the appropriate direction resulting in the lowering or raising of threaded collar 6 and corresponding compression or decompression of the spring 9. Thus, in calm weather conditions, the device must be more sensitive than in rough conditions and the spring should have a minimum load. For rough conditions, the load on the spring should be increased.

I claim:

1. A fishing rod support and warning device comprising:
   (a) an elongated housing having an inner wall which includes at least one rib aligned along the longitudinal axis of the housing;
   (b) a contact rod having an outer end for supporting a fishing rod, and a threaded inner end for closing an electric circuit having a power source and a warning means whenever said fishing rod depresses said outer end of said contact rod;
   (c) spring mounting means including a spring for resiliently mounting said threaded inner end of said contact rod within said housing, and
   (d) means for altering the degree of said resilience of said spring mounting means including said outer end of said contact rod, a disc having internal threads for threadably engaging said threaded inner end of said contact rod, and a peripheral recess for receiving said housing rib.

2. A fishing rod support and warning device as claimed in claim 1, wherein said housing includes means for fixing said fishing rod support means in a substantially upright position on the ground.

3. A fishing rod support and warning device as claimed in claim 1, wherein said power source is constituted by one or more batteries connected in series and located within said housing.

4. A fishing rod support and warning device as claimed in claim 3, wherein said warning means includes an omnidirectional light source located within said housing.

5. A fishing rod support and warning device as claimed in claim 4, wherein said housing comprises three separate portions which are capable of assembly and disassembly by means of first and second threaded connections, said first threaded connection being located adjacent the inner end of said contact rod, and said second threaded connection being located to enable access to said batteries and said omnidirectional light source.

6. A fishing rod support and warning device comprising:
   (a) an electric light bulb;
   (b) at least one battery;
   (c) a contact rod having an outer end for supporting a fishing rod, and a threaded, electrically conductive inner end for forming an electric circuit between said light bulb and said battery when said fishing rod depresses said outer end of said contact rod;
   (d) spring mounting means including an electrically conductive spring for both resiliently mounting said threaded inner end of said rod within said housing, and for forming an electric circuit between said light bulb and said battery;
   (e) an elongated housing, including
      (i) a first section including an inner wall having at least one rib aligned along the longitudinal axis of said housing for housing said threaded inner end of said contact rod and said spring mounting means,
      (ii) an electrically conductive second section for both housing said battery and for forming an electric circuit between said light bulb and said battery,
      (iii) a third section for housing said light bulb, and
      (iv) first and second electrically conductive threaded collars for both joining said first and second housing sections, and said second and third housing sections, respectively, and for forming an electric circuit between said light bulb and said battery, and
   (f) means for altering the degree of said resilience of said spring mounting means including said outer end of said contact rod, a disc having internal threads for threadably engaging said threaded inner end of said contact rod, and a peripheral recess for receiving said housing rib.

* * * * *